Aug. 27, 1957     J. J. LEONE     2,804,538
ILLUMINATED MEASURING DEVICE
Filed June 27, 1955
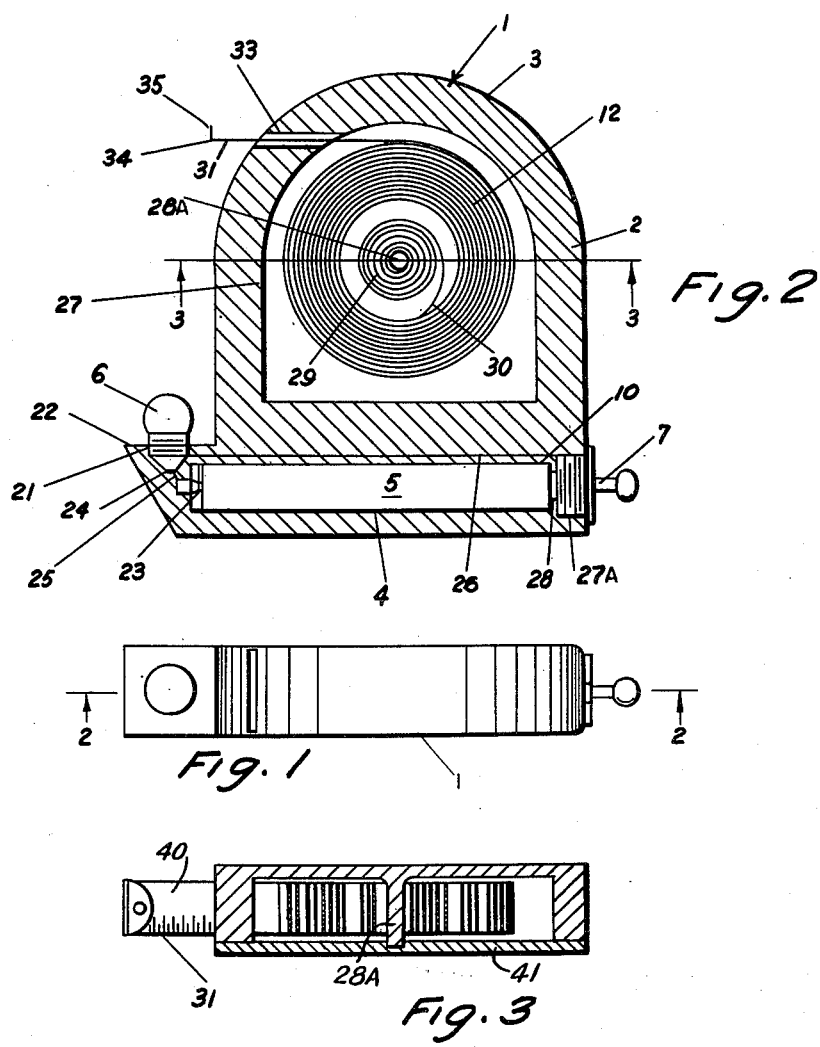
INVENTOR.
JOSEPH J. LEONE
BY United States Patent Office 2,804,538
Patented Aug. 27, 1957

2,804,538

ILLUMINATED MEASURING DEVICE

Joseph J. Leone, Erie, Pa.

Application June 27, 1955, Serial No. 518,150

1 Claim. (Cl. 240—6.4)

This invention relates to measuring devices and more particularly to the combination of measuring devices and light.

In measuring devices made according to previous designs and with which the inventor is familiar, the measuring devices were difficult to use in poorly illuminated areas. Also, the calibrations on presently used scales are difficult to view, except in a strong light.

It is, accordingly, an object of this invention to provide a measuring tape in combination with a light which is simple in construction, economical to manufacture, and simple and efficient to use.

Another object of the invention is to provide a measuring tape wherein the light in combination therewith is disposed thereon in position to illuminate the tape and yet not impair the visibility thereof by the operator.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

Fig. 1 is a view of a scale according to the invention;

Fig. 2 is a cross sectional view taken on line 2—2 of Fig. 1; and

Fig. 3 is a cross sectional view of the scale taken on line 3—3 of Fig. 2.

Now with more specific reference to the drawing, a tape measure and light combination 1 is shown having a body portion 2 which extends upwardly and curves at 3 having a neat appearing body. A bore 4 is formed in the lower end thereof for receiving a dry cell battery 5. A threaded opening 21 is formed on a ledge 22 which receives a bulb 6. Positive terminals 23 of the battery 5 are electrically connected to a terminal 24 of the bulb 6 by means of a connecting wire 25. A connecting wire 26 is attached to a metallic member 27A at the rear thereof which has a screen 28 engaging the rear portion of the battery 5 to form a contact therewith.

The body 2 is hollow at 27 and has an axle 28A therein which has a spring 29 coiled therearound and the spring 29 is connected at 30 to tape 31 and urges it to coil around the axle 28A. The tape 31 is preferably calibrated in inches in the ordinary manner and extends through a slot 33 in the body member 2 and terminates in an end 34 which has a stop 35 on the end thereof to prevent the tape 31 from being drawn through the slot 33. The scale is calibrated on the side 40 thereof and the light from the bulb 6 when illuminated casts a beam on the calibrated surface. Therefore, when the light is turned on and the tape 31 pulled out to the proper length, the operator can read the calibrations on the scale regardless of the illumination of the environment thereof. The body 2 is made of an integral flat, relatively thick sheet of material having a hollow formed therein for receiving the tape as shown and a cover 41 supported thereon for closing the hollow which contains the tape. The cover 41 could be attached to the side of the body by any conventional fastening means.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a holder for measuring tape and means for illuminating said tape, said holder comprising a flat box closed except for a slot in the edge wall of said box, a roll of measuring tape mounted for rotation in said box and having one end thereof extending through said slot, said means for illuminating said tape comprising an extension of said box coextensive in thickness with said box, said extension having a longitudinal bore for a dry cell battery, a portion of said extension projecting beyond said box and having a lamp socket so positioned that a bulb in said socket will have its axis substantially perpendicular to the run of tape extending from said box, the end of said extension opposite from said lamp socket being closed by a cap containing a switch.

References Cited in the file of this patent

UNITED STATES PATENTS 1,276,311     Armbruster _____ Aug. 20, 1918
2,354,853     Dobbs _____ Aug. 1, 1944